United States Patent
Lair et al.

[11] Patent Number: 5,097,661
[45] Date of Patent: Mar. 24, 1992

[54] JET ENGINE HAVING A PLANAR EXIT OPENING

[75] Inventors: Jean-Pierre Lair, Plaisance; Etienne Fage, Ramatuelle, both of France; Thomas E. Finch, San Antonio, Tex.

[73] Assignee: The Dee Howard Company, San Antonio, Tex.

[21] Appl. No.: 331,128

[22] Filed: Mar. 31, 1989

Related U.S. Application Data

[63] Continuation-in-part of Ser. No. 304,100, Jan. 31, 1989, abandoned.

[30] Foreign Application Priority Data

Nov. 10, 1988 [FR] France .................. 88-14695

[51] Int. Cl.⁵ ............................................... F02K 1/60
[52] U.S. Cl. .................... 60/226.2; 60/226.1; 239/265.39
[58] Field of Search ............. 60/226.2, 226.1, 228, 60/230, 270.1; 239/265.11, 265.19, 265.33, 265.37, 265.39; 244/110 B, 23 D, 12.5, 52

[56] References Cited

U.S. PATENT DOCUMENTS

| | | | |
|---|---|---|---|
| 3,353,355 | 11/1967 | Jordan ................ | 60/226.2 |
| 3,604,662 | 9/1971 | Nelson et al. ........ | 244/110 B |
| 4,519,561 | 5/1985 | Timms ................ | 60/230 |

Primary Examiner—Louis J. Casaregola
Assistant Examiner—Laleh Jalali
Attorney, Agent, or Firm—Pollock, Vande Sande & Priddy

[57] ABSTRACT

To eliminate the fish-mouth geometry at the downstream portion of a thrust reverser fitted jet engine which results from the formation of substantially arcuate notches when the thrust reverser doors are stowed, moveable flaps are positioned in close proximity to the doors such that when the doors are in their stowed position, the flaps would fill, at least partially, the arcuate notches to effect a substantially planar exit opening, thereby substantially eliminating the fish-mouth geometry. Moreover, the flaps can be used to effect a uniform thickness for the exit opening of the jet engine by each having a shape corresponding to that of the corresponding arcuate notch; and the principal outer surfaces and inner surfaces of the flaps provide continuity with the outer surfaces and the inner surfaces, respectively, of the doors, with the ends of the flaps have trailing edge which have thicknesses similar to those of the trailing edges of the doors. Thus, when the doors are in their stowed position, the respective trailing edges of the doors and the flaps form a minimum base surface, at the exit opening of the jet engine, in the shape of a ring having a uniform minimum thickness.

24 Claims, 14 Drawing Sheets

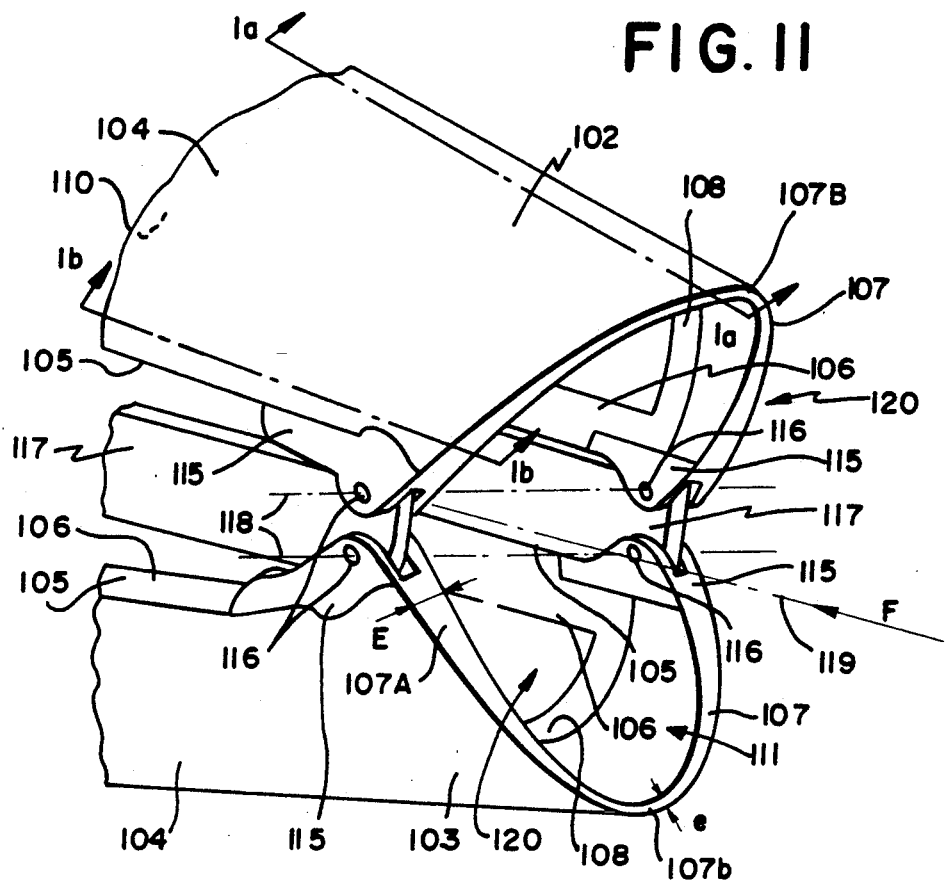
FIG. 11
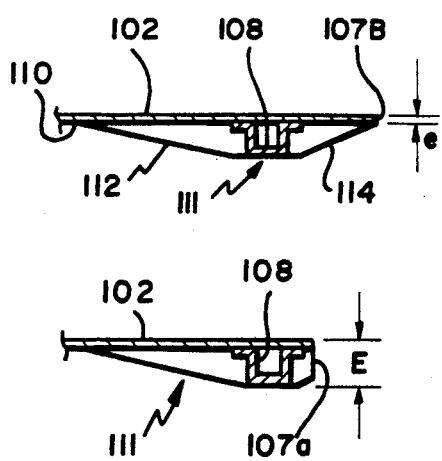
FIG. 11a
FIG. 11b
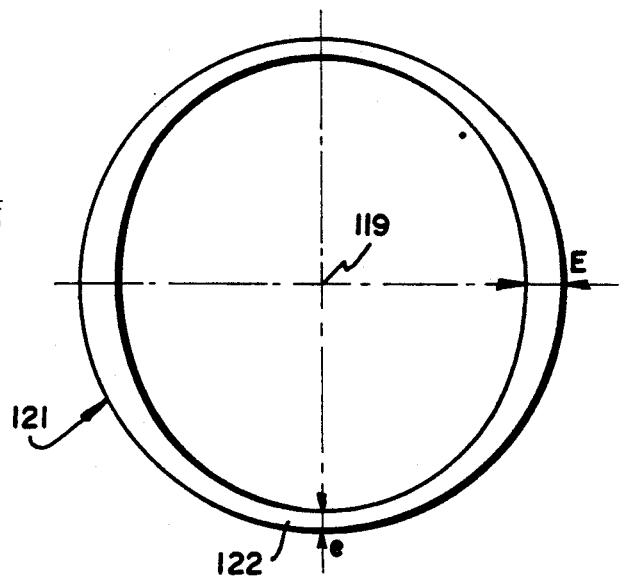
FIG. 12

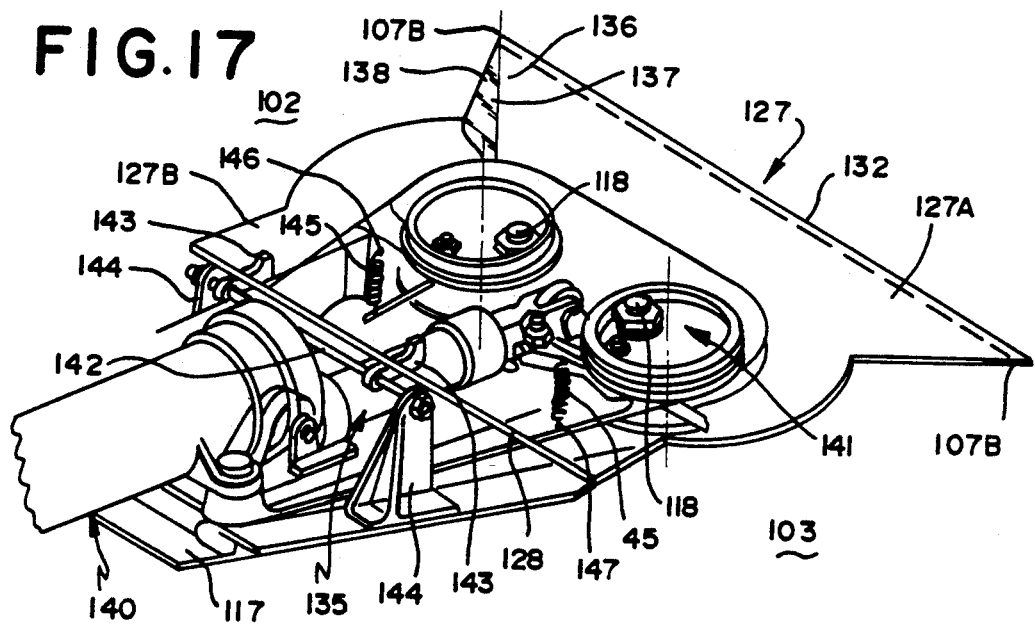
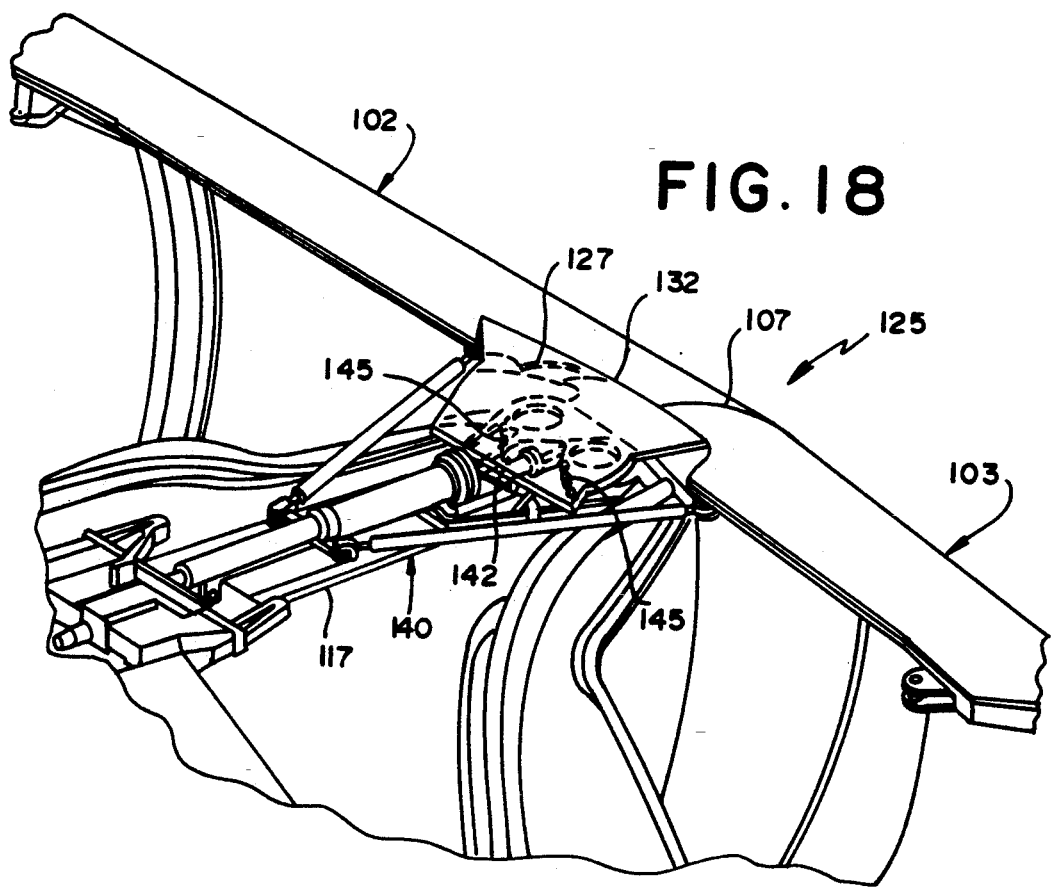

JET ENGINE HAVING A PLANAR EXIT OPENING

This application is a Continuation-In-Part of patent application Ser. No. 304,100 filed Jan. 31, 1989 (abandoned).

FIELD OF THE INVENTION

The present invention relates to thrust reversers for jet engines, with or without by-pass of the main jet, mounted in particular on an aircraft, and more specifically to the modification of a thrust reverser on the engine of an aircraft such that the geometry of the exit opening for the engine becomes substantially planar.

BACKGROUND OF THE INVENTION

Thrust reversers are well known for shortening the braking distance of an aircraft to increase safety, especially when it is necessary to brake on a damp or icy runway. Typically, a thrust reverser for a jet engine has two or more doors mounted about axes disposed at the downstream end of the engine, proximately at its exhaust. The thrust reverser doors are arranged to pivot from a folded, or stowed, position in which they form part of the nozzle of the engine of the aircraft, to an unfolded, or deployed, position in which they are disposed transversely of the jet output from the aircraft.

Such a thrust reverser can be added to the downstream portion of a number of jet engines, with or without fan by-pass ducts. However, it is believed that the non-planar or "fish-mouth" exit opening provided by stowed reverser doors may affect the efficiency of the engine during its cruising phase, as the effluent exits mouth effect results from the geometrical necessity of the thrust reverser doors having to pivot about respective hinges located at opposite sides, at the downstream portion, of the engine.

When the thrust reverser is installed downstream from the engine, the doors of the reverser, when in the stowed position, form extensions of the ejection nozzle through which the gaseous jet flow passes.

There are various embodiments of these doors which are specifically suited to this type of thrust reverser. For example, it may be advantageous to use the doors described in French Patent FR-A-2 348 371, partially represented in the attached FIG. 11, with the doors in their stowed position. In this case, two doors 102 and 103 of reverser 100 are formed as extensions of a curved wall 104 having a more or less hemitruncated shape, and each of them is stiffened in the area of its longitudinal edges 105 by rectilinear sectional bars 106, and, in the area of its forward arcuate or circular edge (not visible in the Figure) and rear arcuate or circular edge (or trailing edge 107), by arched sectional bars 108, of which the bar for the door 102 is shown in cross-section in FIGS. 11a and 11b. The set of rectilinear and arched sectional bars, 106 and 108 respectively, form a stiffening framework which protrudes in relation to concave surface 110 of each door 102 and 103.

Furthermore, an inner lining 111, attached to wall 104 by means of inclined surfaces 112 and 114, encloses each arched rear sectional bar 108, while within the extension of rear arched sectional bar 108 on each door are arranged two attachment hinges 115, substantially diametrically opposed to each other, which, by means of joints 116, connect doors 102 and 103 to rigid arms 117 emanating from the engine ejection nozzle. Doors 102 and 103 may thus pivot around their downstream transverse hinge pins 118.

As shown in FIG. 11, trailing edges 107 of doors 102 and 103 fall respectively within transverse planes which are inclined symmetrically in relation to the longitudinal axis of the engine, in order to ensure that, when the doors are in the deployed (extended) position (and trailing edges 107 are thus in contact or abut with each other), the direction of the gaseous jet flow is reversed to obtain the desired counter-thrust. Consequently, when the doors are in the stowed (folded) position (FIG. 11), end pieces 107A of the two trailing edges 107, which arise approximately at the level of attachment hinges 115, which form the extension of the ends of the rear arched sectional bars 108, mark off between them two crescent-shaped (or substantially arcuate) indentations 120, and the projections formed from each of these indentations in a lateral plane have an approximately triangular shape forming substantially arcuate notches.

Trailing edge 107 of each door has, in its inclined transverse plane, a varying progressively-increasing thickness, the thickest point of which "E" is found at end pieces 107A close to the joints and matches approximately the height of the rear arched sectional bars 108 (FIGS. 11 and 11b), while the smallest thickness "e" is found in central portion 107B of each trailing edge (FIGS. 11 and 11a).

Consequently, when the section of trailing edges 107 of doors 102 and 103 is projected onto a plane perpendicular to the longitudinal axis of the engine 119, a surface 121, called a base surface by those skilled in the art, is obtained (FIG. 12) which approximately resemble a ring 122 whose thickness "E" at transverse hinge pins 118 of the doors is noticeably greater than the thickness "e" located perpendicularly.

Although the structure of the reverser described in the patent FR-A-2 348 371 and summarized above with reference to FIGS. 11, 11a, 11b and 12, endows the doors with excellent rigidity, while allowing, furthermore, the optimal deflection of the reversed gaseous jet flow, this structure produces additional aerodynamic drag because of the sizable thickness "E" of base surface 121, at trailing edges 107 of the end pieces.

In actuality, when the aircraft is in flight and the doors of the reverser(s) are stowed, small air currents flow along the outer surfaces of the doors and tend to follow the surface of the trailing edges of the doors. Given this phenomenon, and the fact that end pieces 107A of the trailing edges 107 have the thickness "E", which is an important factor in this type of reverser, the air currents would abruptly change direction, thus producing significant aerodynamic turbulence which causes additional drag. The flow of the air currents at the central portions 107B of the trailing edges, meanwhile, is not changed by virtue of the small thickness "e" at these central portions.

To prevent this drag, one solution consists of reducing the thickness "E" of end pieces 107A at the trailing edges.

BRIEF DESCRIPTION OF THE PRESENT INVENTION

To resolve the aforenoted problems and to effect a substantially planar annular exit opening for an engine equipped with a target thrust reverser, two symmetrical members, such as flaps, are movably mounted to the thrust reverser structure, in close proximity to the hinges where the thrust reverser doors are pivoted. These flaps may be moved lengthwise along the longitudinal axis of the engine, between at least two positions, by means of linkage rods which may be connected to the main hydraulic driver used to pivot the thrust reverser doors. The flaps, although located in close proximity to the thrust reverser doors, are moved in such a way, conveniently in response to movement of the thrust reverser doors, that the movement of the doors is not obstructed.

In the cruising mode for an aircraft, with the thrust reverser doors stowed at the downstream portion of the jet engine to form an extension thereof, the flaps are positioned in a first position, which is operative to fill in the substantially arcuate notches formed by the stowed doors at the exit opening. Thus, instead of an exit opening which, due to the arcuate notches, is non-planar, a substantially planar annular exit opening for the engine is provided.

When the thrust reverser doors are in their deployed position, to provide braking thrust during the landing of the aircraft, the flaps are moved to a second inoperative storage position, where they are positioned away from the jet output from the engine.

It is, therefore, an objective of the present invention to provide a substantially planar annular exit opening for an engine equipped with a target type thrust reverser when the reverser doors are stowed.

With respect to, in particular, the doors described in French Patent FR-A-2 348 371, whose base surface at the trailing edges has a uniform minimal thickness, the present invention is able to suppress the aforediscussed aerodynamic drag, while still preserving a suitable thickness for the end pieces of the doors at their trailing edges.

For this purpose, the thrust reverser, designed in particular for the jet engine of an aircraft, and of the type which incorporates at least two doors, each of which is mounted to pivot around a pin set transversely to the jet flow of the engine in such a way that the doors may be set either in a folded (or stowed) position, in which they form a portion of the filleting of the engine or fuselage of the aircraft, or an extended (or deployed) position, in which the doors are positioned transversely to the gaseous jet flow, and of the type in which the trailing edges of the doors, contained within transverse planes inclined in relation to the longitudinal axis of the engine, mark off laterally, when in the folded position, indentations of a more or less crescent shape (or substantially arcuate notches) and have, within their respective planes, end pieces of a greater thickness than that of their central portion, is distinguished, according to the invention, by the fact that it has movable flaps having a shape which corresponds at least partially to that of the indentations, and whose principal external and internal surfaces extend in a continuous manner the external and internal surfaces, respectively, of the doors, in such a way that at the end of these surfaces is found a trailing edge having a thickness smaller than that of the end pieces, and by the fact that the flaps may, when the doors are in the folded position, be in a position of alignment extending the doors and filling the indentations, and are, when the doors are in the extended position, projecting outward.

Thus, in the stowed position, when the trailing edges of the doors and the flaps are projected onto a plane perpendicular to the longitudinal axis of the engine, the base surface obtained is reduced, thus nullifying the additional drag caused by the base surface of the trailing edges of the doors which has varying thicknesses, in the absence of the movable flaps. Furthermore, the thickness of the end pieces of the trailing edges of the doors remains unchanged, since the flaps form extensions of the doors, in such a way that the safety and reliability of the door joints on the rigid arms extending from the nozzle are maintained.

In an advantageous arrangement, the trailing edge of each movable flap has a thickness approximately equal to that of the central portion of the trailing edges of the doors. Thus, the base surface takes the final form of a ring having a uniform, minimal thickness, and is approximately equal to the surface that would have existed when the nozzle has no thrust reverser.

Furthermore, the movable flaps provide another advantage. In fact, when the doors are in the deployed position, the flaps would project outward, thus producing an additional drag which is added to the counter-thrust created by the extended doors.

According to another feature of the invention, the movable flaps are connected to rigid arms extending from the nozzle by means of controllable jointing mechanisms. Advantage is obtained by using mechanical controllable jointing mechanisms, which make it possible to ensure the repositioning of the movable flaps from a position of alignment to a position of protrusion, and vice versa.

Furthermore, the lateral sides of the movable flaps, designed to come into contact with the end pieces when the doors are stowed, may each have an inclined piece which, in this stowed position, works in conjunction with a matching inclined piece placed on each end piece of the trailing edges of the doors, and the two inclined pieces on each flap converge substantially in the direction of the longitudinal axis of the engine.

Because of this arrangement, when the doors are activated to move from the stowed to the deployed position, the doors would automatically drive the movable flaps outward toward their protruding position, by means of the inclined pieces.

Advantage will be gained by sheathing the inclined pieces of the flaps and the end pieces with an anti-friction material.

Furthermore, an airtight joint may be installed between the inclined pieces.

In one specific embodiment, the controllable jointing mechanisms on each flap contain a jointing pin which is orthogonal to the transverse jointing pins of the doors and is connected to the corresponding rigid arm; they also contain elastic return-motion devices connected by their respective ends to the flap and arm.

Thus, when the doors are moved from the stowed position toward the deployed position, the movable flaps, which are driven from their initial, aligned position by the inclined pieces, would pivot around their jointing pin and move into the protruding, outwardly-turned position. Inversely, when the doors are activated to move from the deployed to the stowed position, the movable flaps are brought back into their aligned position as a result of the elastic return devices, in such a way that the inclined pieces of the flaps would come into contact with the inclined pieces of the end pieces.

In another embodiment, the controllable jointing devices on each flap have a torsion bar, othogonal to the transverse jointing pins on the parts, which is connected to the corresponding rigid arm of the nozzle. This embodiment makes it possible to do without the elastic return devices, since the return of the movable flaps from the projecting position to the alignment position is obtained because of the inherent properties of the torsion bar.

In yet another embodiment, the controllable jointing devices on each flap are comprised of a system of connecting rods whose ends are connected to the flap and to the doors, respectively, by means of ball joints.

Accordingly to still another invention characteristic, the movable flaps may be held in the projecting position using a mechanical finger-and-cam system arranged between the attachment hinges of the doors and the flaps.

The above-mentioned objective and advantages of the present invention will become more apparent and the invention itself will be best understood by reference to the following description of the invention taken in conjunction with the accompanying drawings, wherein:

BRIEF DESCRIPTION OF THE DRAWINGS

FIG. 11 shows a schematic, partially cut-away perspective view of the rear portion of a thrust reverser mounted downstream from an aircraft engine;

FIGS. 11a and 11b show schematic cross-sections along the lines Ia—Ia and Ib—Ib, respectively, of FIG. 11;

FIG. 12 is a view made from the direction of the arrow F in FIG. 11, showing the surface of the trailing edges of the doors in the stowed position, projected in a plane perpendicular to the longitudinal axis of the engine;

FIG. 17 represents, in perspective, the mounting of one of the movable flaps on the corresponding arm of the nozzle using controllable jointing devices, in which the flap is in a position of alignment with the doors when these are in the stowed position;

FIG. 18 represents, in perspective, the movable flap of FIG. 17 in the projecting position, and the doors of the reverser, which are in the deployed position.

DETAILED DESCRIPTION OF THE PRESENT INVENTION

Figure 13:
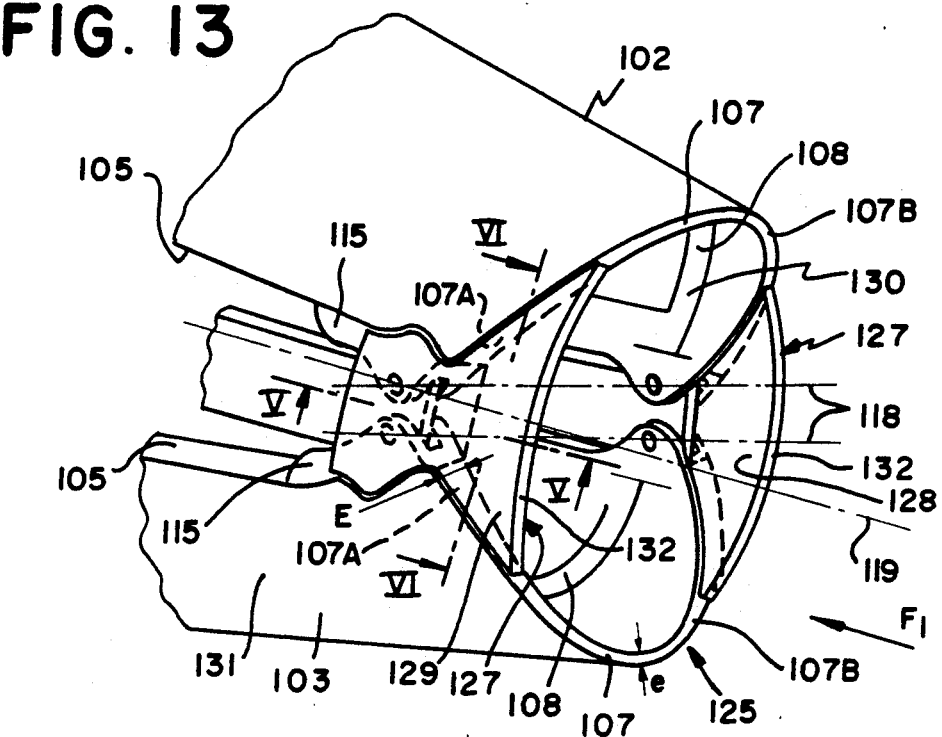
FIG. 13 shows a schematic, partially cut-away perspective view of the rear part of a thrust reverser according to the invention.

A thrust reverser 125 according to the invention, shown in FIG. 13, is comprised of two doors 102 and 103 having a structure which is analogous to that described previously with reference to FIG. 11. These doors, which are shown in their stowed position, therefore each has a trailing edge 107, which, by virtue of the structure of the doors, has, within its inclined transverse plane, end pieces 107A of a thickness "E" which decreases progressively as the end pieces extend toward each other, so as to have a thickness "e" at their central portion 107B.

To avoid the problems caused by aerodynamic drag as previously discussed, which are created by the large thickness "E" at end pieces 107A at trailing edges 107, thrust reverser 125 has, in accordance with the invention, movable flaps 127 having a shape corresponding at least partially to that of the substantially arcuate notches or indentations 120 previously described with reference to FIG. 11. The principal internal surface 128 and external surface 129 of each flap 127 are extensions of internal surface 130 and external surface 131, respectively, of doors 102 and 103 of reverser 125, and they end in a trailing edge 132 having a thickness which is smaller than the thickness "E" of the end pieces 107A. Advantage is obtained by making the thickness of the trailing edge 131 of flaps 127 identical to the thickness "e" of central portion 107B at trailing edge 107 of the doors.

Figure 14:
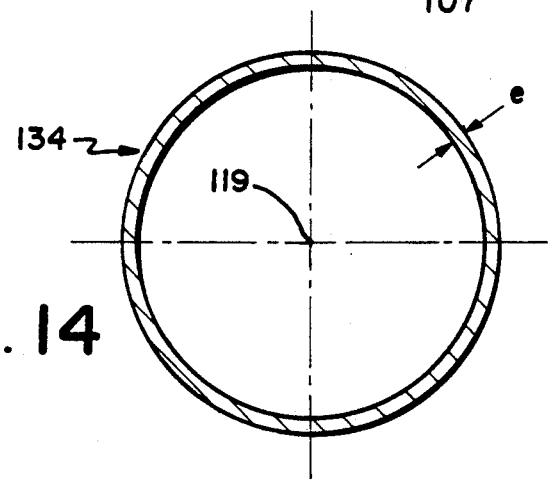
FIG. 14 is a view made from the direction of the arrow F1 in FIG. 13, showing the base surface of the reverser according to the invention equipped with movable flaps.

In this way, because of the arrangement of these movable flaps, a base surface 134 is obtained which corresponds to the projection in a plane perpendicular to the longitudinal axis 119 of the engine, at trailing edges 107 and 132 of the doors and flaps, respectively, and which has, as shown in FIG. 14, the shape of a ring having a uniform, minimal thickness "e". This thickness "e" corresponds to that of the central portion 107B at trailing edges 107 of the doors. The base surface obtained is thus analogous to the one which would have existed at the nozzle outlet in the absence of a thrust reverser. Because of this arrangement of the invention, the aerodynamic drag created by the thickness "E" of end pieces 107A is suppressed, while still preserving this thickness "E" at the door joints.

Figure 15:
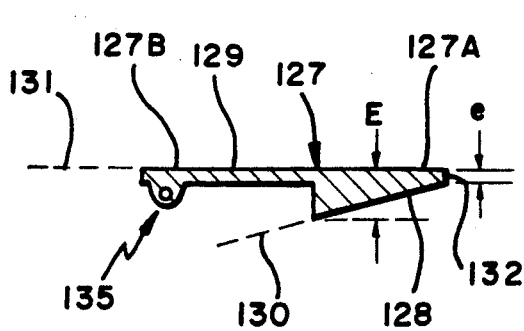
FIG. 15 is a view of one of the movable flaps along the line V—V of FIG. 13.

As shown in FIG. 15, internal surface 128 and external surface 129 of each flap 127 converge toward each other, by forming extension along internal surface 130 and external surface 131 of doors 102 and 103, thus giving a trailing edge 132 having a thickness "e" matching that of central portions 107B at the trailing edges of the doors. It may also be seen in this specific embodiment, that each flap 127 has a downstream part 127A which matches the part filling indentation 120, and an upstream part 127B which, when the doors are stowed, covers the attachment fittings 115 of the doors. The installation of the movable flaps 127 on the rigid arms 117 extending from the nozzle is accomplished using controllable jointing devices 135, symbolically represented in FIG. 15, which are connected to the internal surface of the upstream part 127B of each flap 127. Devices 135 will be described subsequently with reference to FIGS. 17 through 20.

Movable flaps 127 may, at first, when doors 102 and 103 of the reverser are stowed, be in a position of alignment by forming extensions of the doors and thus sealing off indentations 120, and secondly, when the doors are deployed, be in a projecting position turned outward.

Figure 16:
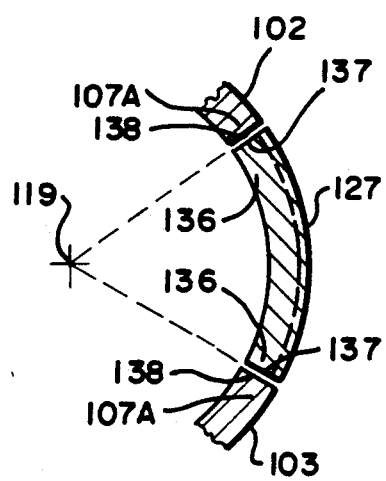
FIG. 16 is a transverse view of one of the movable flaps along the line VI—VI shown in FIG. 13, showing the inclined pieces mounted on the lateral sides of the movable flaps and on the end pieces of the trailing edges of the doors.

Furthermore, as shown in more detail in FIG. 16, the lateral sides 136 of the downstream parts 127A of the flaps 127, designed to come into contact with the end pieces 107A in the stowed position of the doors, each has an inclined piece 137. In the stowed position, the two inclined pieces 137 on each movable flap 127 work in conjunction with the corresponding inclined pieces 138, which are set partially on the end pieces 107A of the trailing edges of the doors. The inclined pieces 137 of each flap, as well as the corresponding inclined pieces 138, converge substantially in the direction of the longitudinal axis of 119 of the engine.

Thus, due to this arrangement, when doors 102 and 103 are activated to move from the stowed to the deployed position, these doors, by means of inclined pieces 137 and 138, automatically drive the movable flaps 127 outward to place the flaps in the projecting position.

Inclined pieces 137 and 138 of the flaps and the end pieces of the doors, respectively, are advantageously sheathed with an anti-friction material which promotes the sliding of the pieces in relation to each other. In addition, an airtight joint, made of a suitable material and not shown in the figures, may also be mounted between the respective inclined pieces on lateral sides 136 of the flaps and end pieces 107A at the trailing edges of the doors.

The movable flap 127, illustrated in FIG. 17, is connected to arm 117 extending out of ejection nozzle of the engine by means of controllable jointing devices 135. In FIG. 17, doors 102 and 103 of the reverser 125 are in the stowed position, such that the flaps 127 are set in the aligned position, in which their external surfaces 129 constitute extensions of the external surfaces 131 of the doors, while their internal surfaces 128 form extension 130 of the doors. Also shown by cross-hatching is one of the inclined pieces 137, which is installed on the corresponding lateral side 136 of the flap 127, and which works in conjunction with the corresponding pieces 138 mounted on the end 107A at the trailing edge.

The mechanisms 140 for activating the doors, as well as the eccentric mechanism 141 for variable nozzle geometry, are, for example, those described in French Patent Application FR-A-87 06410, and will not be explained further.

The controllable jointing devices 135 of the flap 127 shown, which are identical to those on the other flap positioned so as to be diametrically opposed thereto, incorporate a jointing pin 142, orthogonal to the transverse jointing pins 118 of the doors. Pin 142 is held in place by two supporting brackets 143 attached to the internal surface 128 of the upstream part 127B of flap 127. The ends of the pin 142, as shown in FIG. 17, are, in turn, positioned in yokes 144 attached to the rigid arm 117.

The jointing axis is positioned downstream from the transverse jointing pins 118 of the doors.

Furthermore, jointing devices 135 also incorporate elastic return devices, such as two springs 145, one of whose ends is connected at point 146 to internal surface 128 of the flap, while whose other end is connected at point 147 to rigid arm 117. These springs 145 make it possible to keep movable flap 127 flattened against end pieces 107A of doors 102 and 103 by means of their respective inclined pieces 137 and 138, which work in conjunction with each other.

When the doors are moved from the stowed to the deployed position by means of activating devices 140 and eccentric mechanism 141, as shown in FIG. 18, doors 102 and 103 automatically drive out flaps 127 by means of the inclined pieces, and flaps 127 pivot around their respective pins 142. Because of the relative position of jointing pins 142 and inclined pieces 137, flaps 127 retract at the very beginning of the rotation of the doors, whose trailing edges 107 then come into contact with and abut each other, to provide counter-thrust.

Flaps 127 are at this point in an outward-projecting position (FIG. 18), where, for example, they rest against the corresponding longitudinal edges 105 (See FIG. 13) of the doors. However, a finger-and-cam system, not shown, is mounted between attachment hinges 115 (FIG. 13) of the doors and flaps 127, thereby making it possible to hold these flaps in the projecting position during the entire thrust-reversal cycle.

When in this position, since they are turned outward, flaps 127 create additional drag, thereby contributing to the braking of the aircraft.

When the doors return to the stowed position, return springs 145 bring movable flaps 127 back into the alignment position, as inclined pieces 137 of the flaps come into contact with inclined pieces 138 mounted on end pieces 107A at trailing edge 107.

Figure 19:
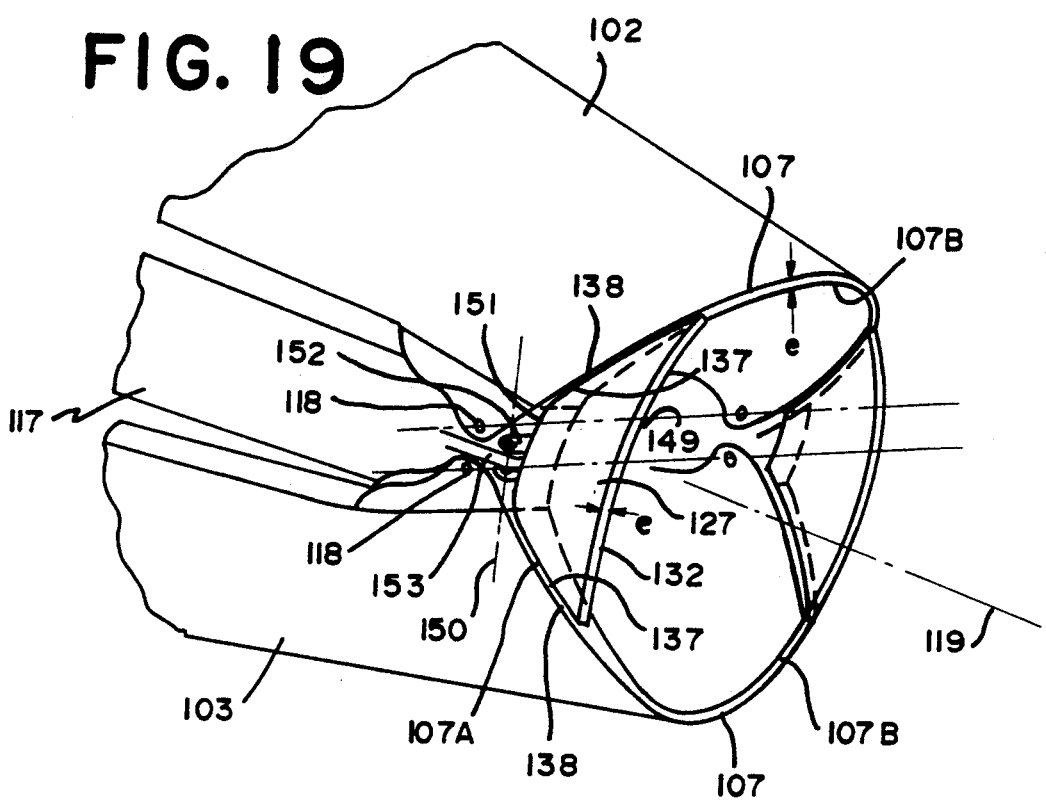
FIGS. 19 and 20 represent, in perspective, two other embodiments of the controllable jointing devices of the flaps, respectively.

FIG. 19 represents a different embodiment of the controllable articulation devices 135 of the flaps. Each flap 127 has a substantially trapezoidal shape designed to seal off the corresponding indentation 120, by coming into contact with inclined pieces 138 of the end pieces 107A, and inclined pieces 137 mounted on the lateral sides mark off indentations 120. The large base 149 of flap 127 corresponds to trailing edge 132 having a thickness "e" which is identical to that of the central parts 107B at trailing edges 107 of doors 102 and 103, and the internal and external surfaces of each flap 127 form extensions of the internal and external surfaces, respectively, of the doors. A torsion bar 150, represented symbolically by an axis line, is mounted on the small base 151 of flap 127 by means of a yoke 152, in such a manner that it pivots about end 153 of rigid arm 117. Torsion bar 150 is mounted perpendicularly to transverse jointing pins 118 of the doors. The operation of the two flaps 127 is similar to that described previously with reference to FIGS. 17 and 18, except for the fact that the return of the flaps 127 from their projecting position to their operative alignment position is accomplished by means of the torsion bar itself.

A bar of this kind could also be mounted on flaps 127, as previously described with references to FIGS. 17 and 18, thus making it possible to do away with the return springs.

Figure 20:
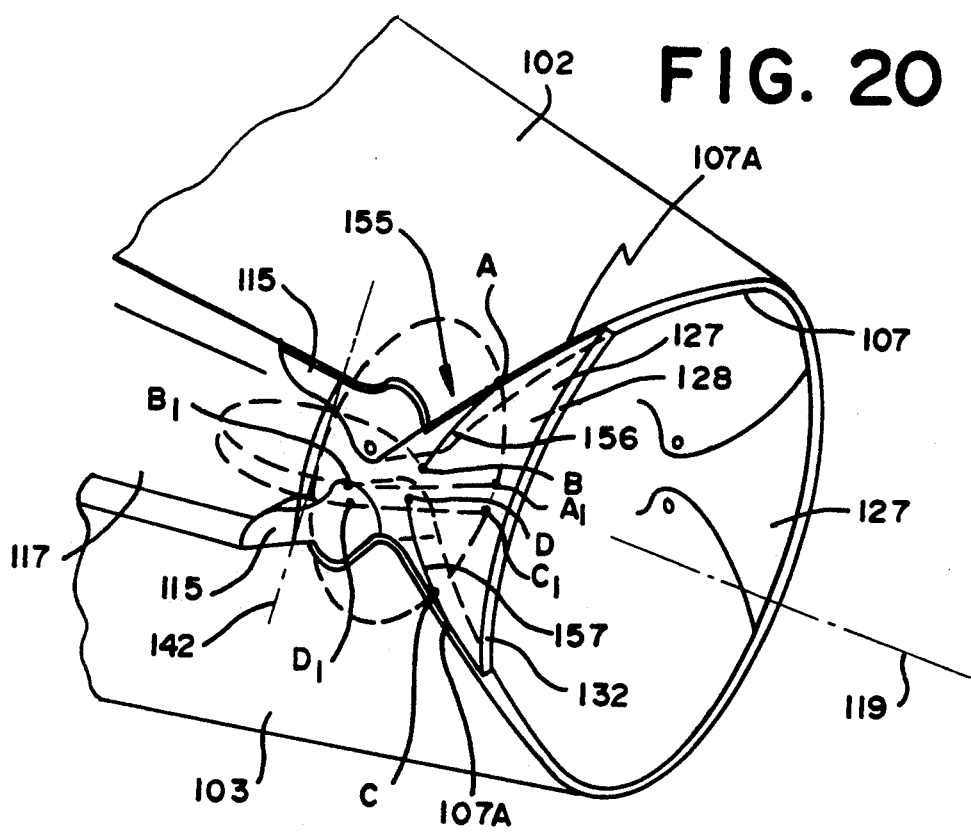

FIG. 20 illustrates another embodiment of the mounting of the flaps 127. In this embodiment, the controllable jointing devices 135 of the flaps, of which only one is shown, are comprised of a system of connecting rods 155. Flaps 127 in this version have a shape and structure approximately similar to those shown in FIGS. 13, 17 and 18.

Connecting-rod system 155 is, for each flap, preferably comprised of two connecting rods 156 and 157 arranged symmetrically in relation to each other, as shown schematically in FIG. 20. The ends of each connecting rod are hinged by using ball joints, first, as illustrated, to internal surface 128 of flap 127, and second, in the area of the end piece 107A at the trailing edge. The connecting rod is joined at point A to end piece 107A of door 102, and at point B to the internal surface of flap 127, while connecting rod 157 is hinged in a symmetrical manner at point C to end piece 107A of door 103 and at point D to the internal surface of flap 127.

When doors 102 and 103 of reverser 125 are activated to move from the stowed to the deployed position, the inclined pieces between end pieces 107A and flaps 127 make it possible to automatically and concomitantly retract the flaps, while avoiding the wedging of said doors.

Point A, at which a ball joint is mounted, describes an arc $AA_1$ centered on the rotational axis of door 102 on which it is mounted in such a way that it moves to $A_1$ when the doors are deployed; and point B, at which a ball joint is mounted, describes an arc $BB_1$ centered on the rotational axis 142 of flap 127 and falling within a plane which is perpendicular to the above-mentioned one. When the connecting rod travels from points AB to points $A_1$ and $B_1$, it causes flap 127 to pivot and holds it in the inoperative projecting position when the doors are deployed.

The displacement of connecting rod 157 from points C and D occurs simultaneously and in a manner identical to that described above for connecting rod 156.

The movable flaps may, of course, be controlled by using hydraulic, pneumatic, or electrical systems.

Yet another embodiment of the invention is described with reference to FIG. 1-10. Like elements are similarly numbered in FIGS. 1-10.

Figure 1:
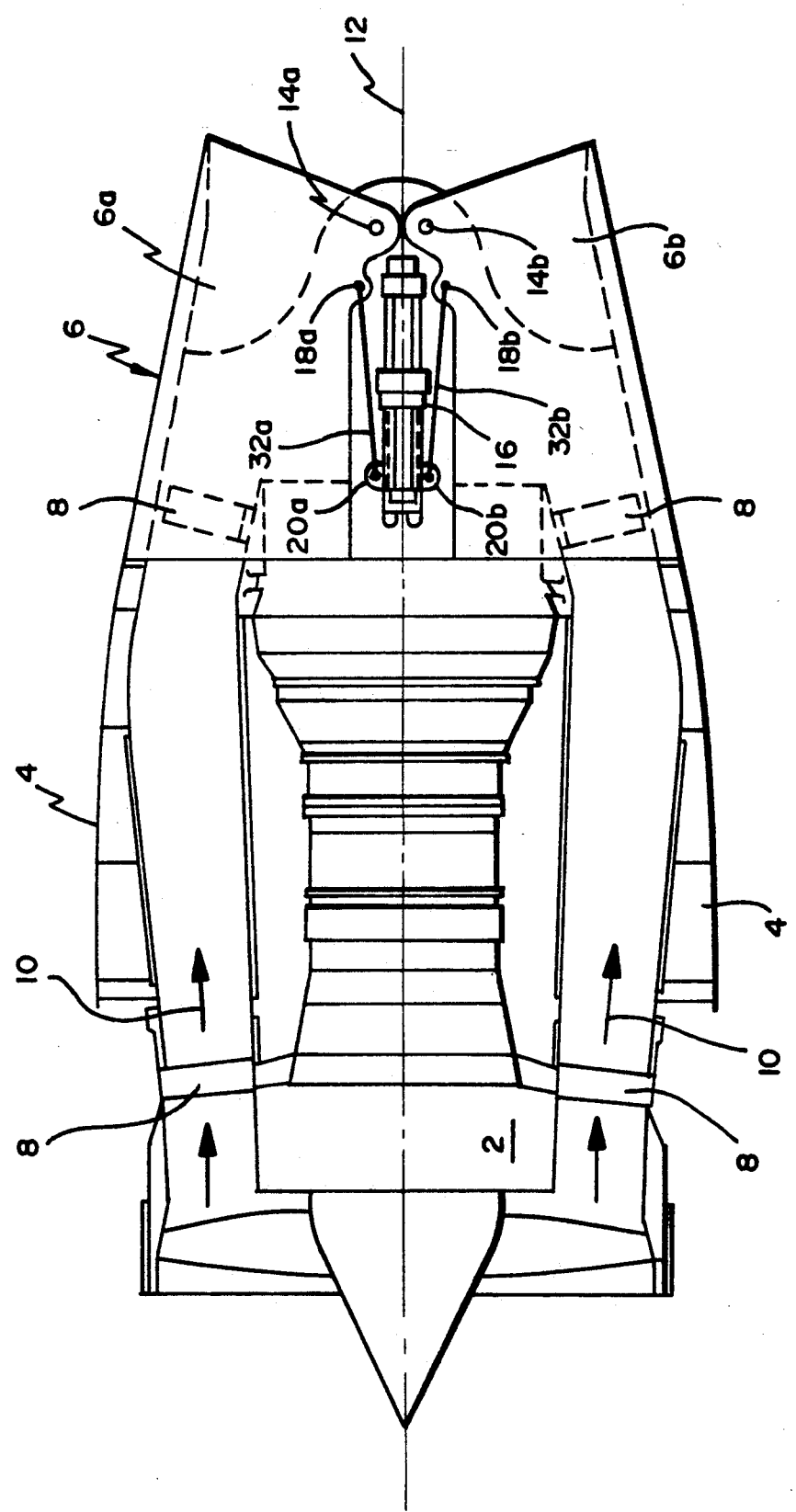
FIG. 1 is a semi-cross-sectional view of a jet engine fitted with a thrust reverser.

Referring to FIG. 1, there is shown a jet engine 2, enclosed by nacelle 4 and fitted with a thrust reverser 6. As can be seen, the jet engine proper of engine 2 is supported and mounted to the engine housing by structural spokes 8. For the by-pass jet engine 2 of FIG. 1, cool air is provided through ducts 4 to the downstream portion of the engine, as shown by arrows 10.

Thrust reverser 6 is mounted downstream of engine 2 and is comprised of two or more doors 6a and 6b, which are each pivotable about an axis transverse to the jet output from the engine, along longitudinal axis 12, and hinges 14a and 14b. Doors 6a and 6b are generally semi-circular in cross-section and, accordingly, are also hinged at respective hinges (not shown).

To pivot doors 6a and 6b, an actuating mechanism, such as a hydraulic piston driver, 16 is used. As shown, driver 16 has two lugs 20a and 20b, each having connected thereto respective first ends of corresponding connecting rods 32a and 32b. The other ends of connecting rods 32a and 32b are coupled to doors 6a and 6b at points 18a and 18b, respectively.

The construction of hydraulic piston driver 16, as well as its relation, in terms of operation, with doors 6a and 6b, are disclosed in U.S. Pat. Ser. Nos. 4,212,442 and 4,422,605, both by one of the inventors of the instant invention and incorporated herein by reference to this application. Briefly, by the translatory movement of lugs 20a and 20b, which transfers the translational movement to respective connecting rods 32a and 32b, doors 6a and 6b can be pivoted to either the position shown in FIG. 1, otherwise known as the folded or stowed position, or to a second position (shown in FIGS. 7 and 10), otherwise known as the unfolded or deployed position.

Doors 6a and 6b, when in their stowed position, form the downstream extension exit opening for jet engine 2. As shown in FIG. 1, the exit opening has a so-called "fish-mouth" geometry (effect), which is non-planar. The fish-mouth geometry results from the fact that the rearwardmost ends of both thrust reverser doors have arcuate edges. The arcuate edges are so configured because they necessarily have to substantially abut, upon deployment of the doors, to permit the doors to effect reversal of the jet from the engine. When the doors are in their stowed position, the edges of the doors form substantially arcuate notches and thereby a non-coplanar exit opening. Some manufacturers of jet engines find this fish-mouth effect to be objectionable, for both its appearance and a possible decrease in engine efficiency when the jet from the engine exits to the environment through the non-planar annular exit opening caused by the fish-mouth geometry.

Figure 2:
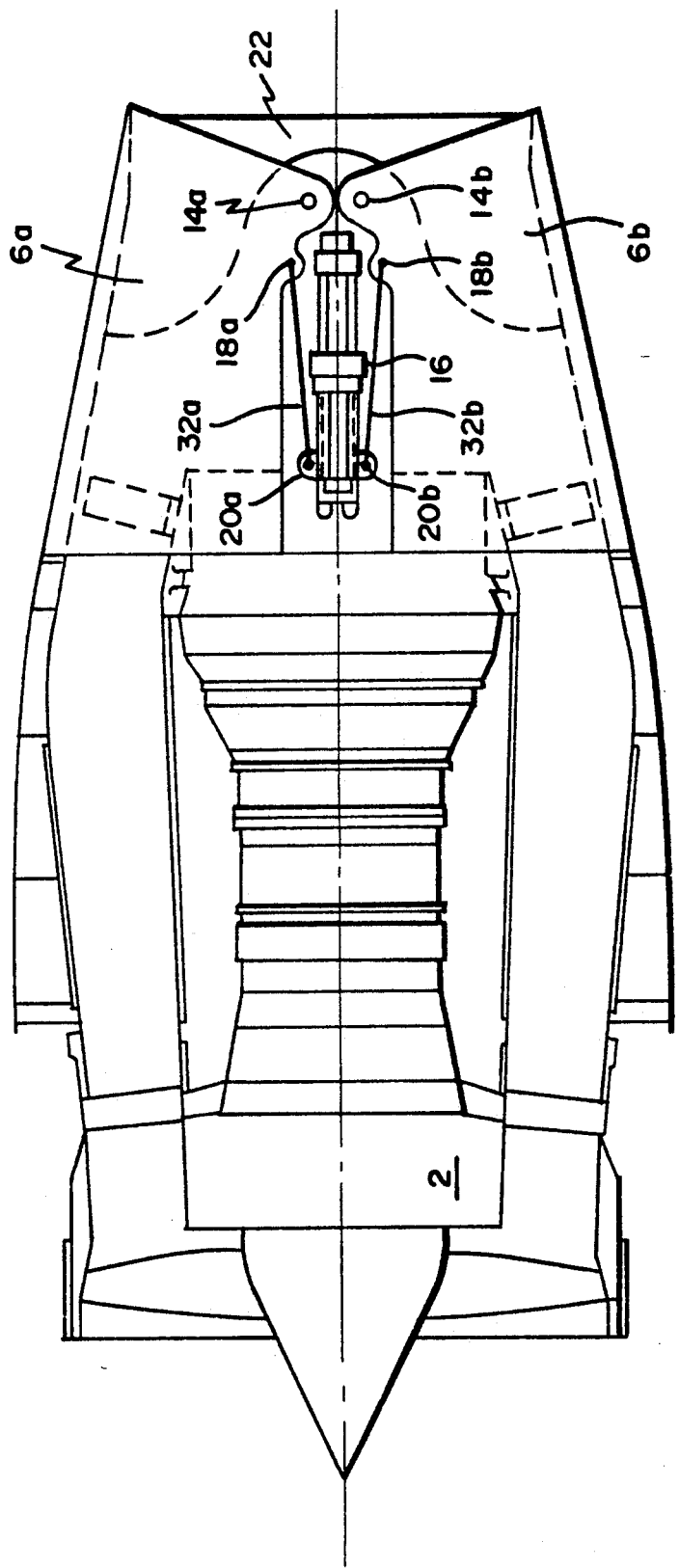
FIG. 2 is a semi-cross-sectional view of a jet engine fitted with a thrust reverser and having a planar annular exit opening according to the instant invention.
Figure 3:
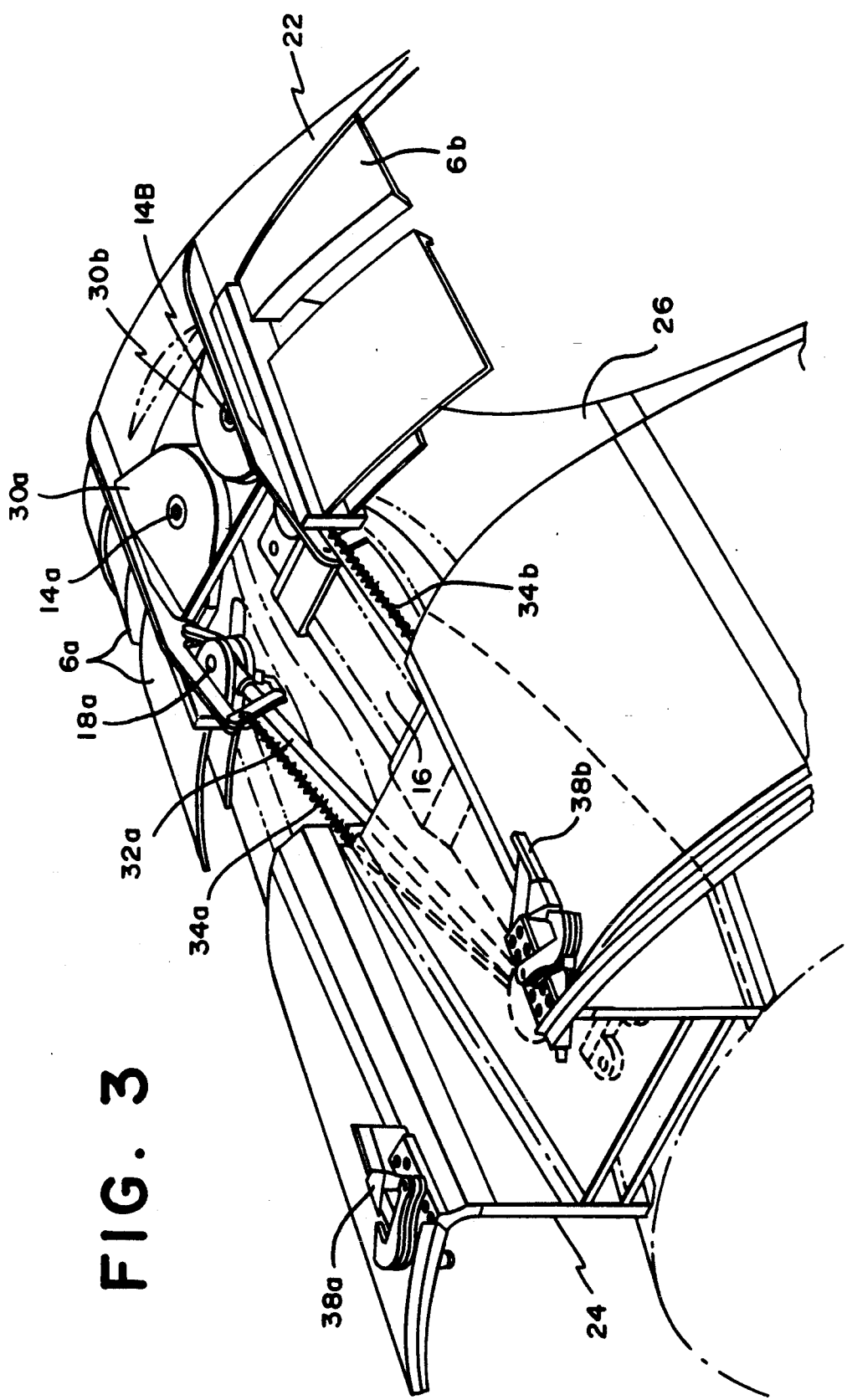
FIG. 3 is a perspective view of the mechanism for effecting the substantially planar annular exit opening of the present invention jet engine.

To remedy this fish-mouth geometry, with reference to FIGS. 2 and 3, two symmetrical members, which are in the shape of flaps 22, are disposed as shown in FIG. 2, when doors 6a and 6b are in their stowed position. For ease of explanation, elements in FIG. 2 which are the same as those of FIG. 1 are numbered the same.

Figure 4:
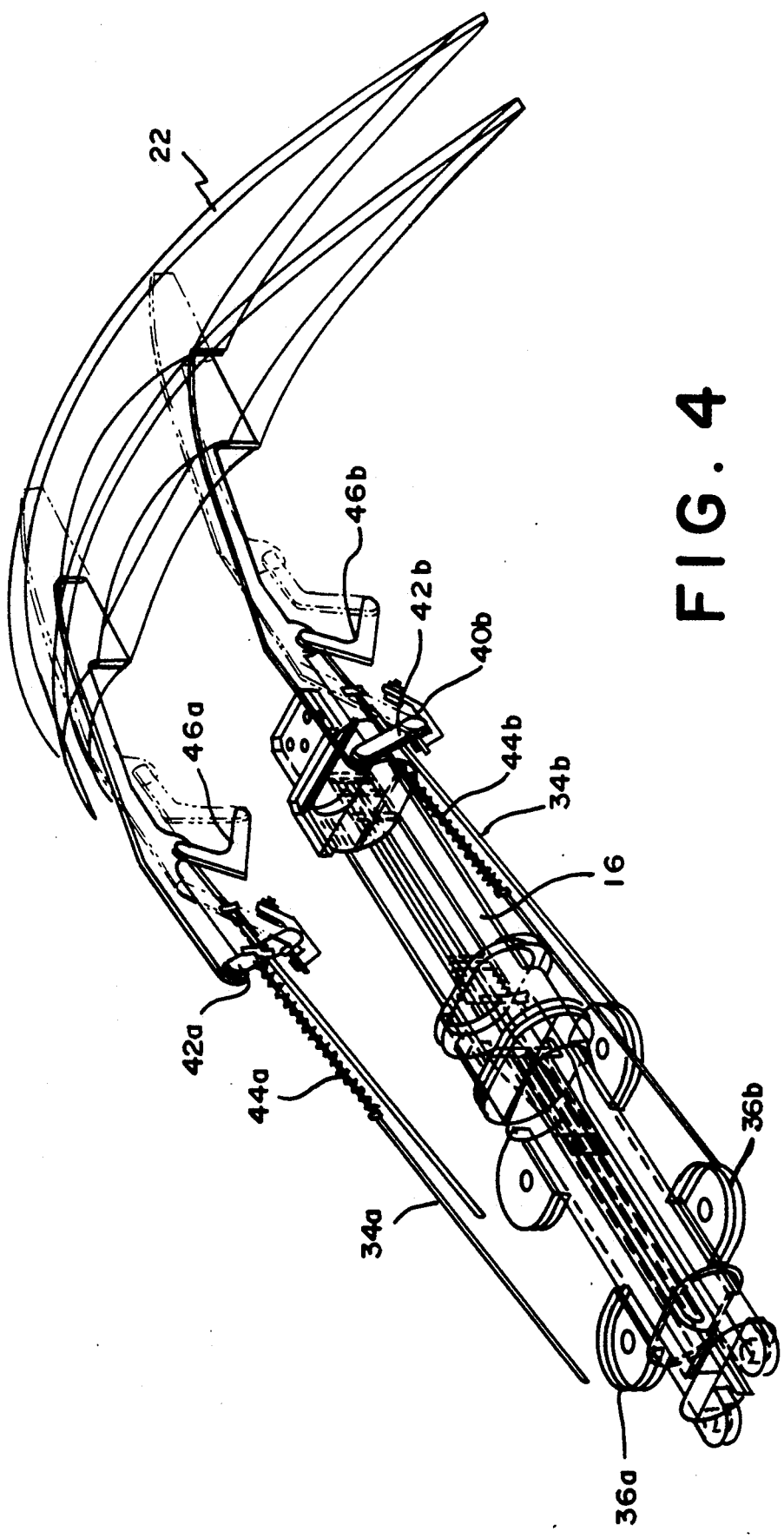
FIG. 4 is another perspective view of the FIG. 3 mechanism without extraneous structures.
Figure 5:
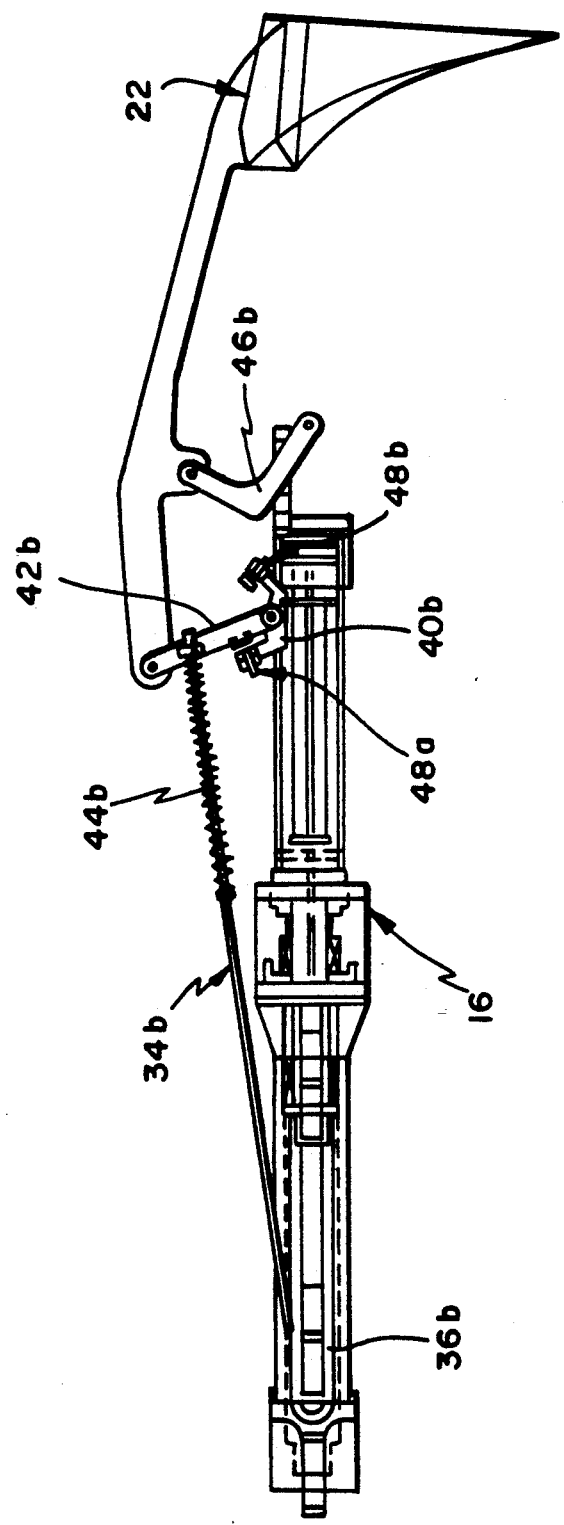
FIG. 5 is a cross-sectional view of the FIG. 4 mechanism shown in an operative position.
Figure 6:
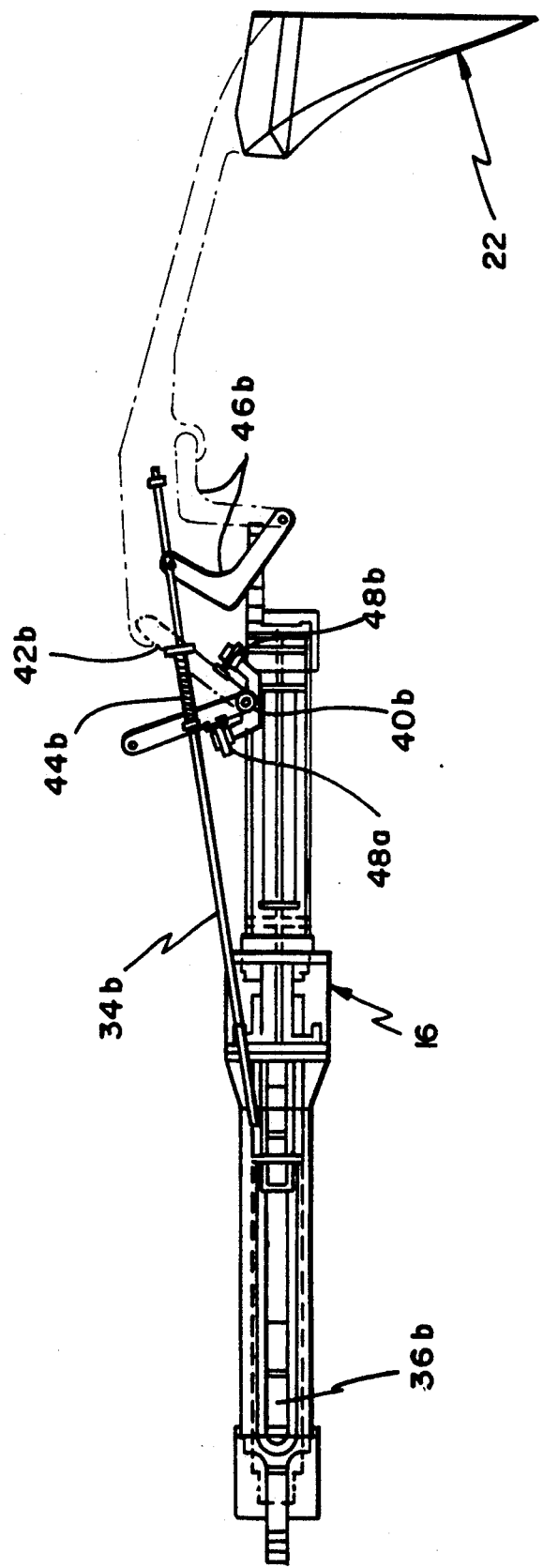
FIG. 6 is a cross-sectional view of the FIG. 4 mechanism shown in an inoperative storage position.

Refer now to FIGS. 3, 4, 5 and 6, each showing only one of two identical flaps used in the engine of FIG. 2. As shown, flap 22 is movably coupled to jet pipe structure 26 which holds the reverser doors. Flap 22, as shown in FIG. 3, is in the stowed position resting against the trailing edge of the reverser doors. Further shown in FIG. 3 are hinge fittings 30a and 30b to which doors 6a and 6b, respectively, are mated to pivot about corresponding points 14a and 14b. To pivot doors 6a and 6b about pivot points 14a and 14b, actuator 16 either pushes or pulls against connecting points 18a and 18b of the thrust reverser doors, by means of connecting linkage rods 32a and 32b. Also connected to hydraulic actuator 16 (more clearly shown in FIGS. 4, 5 and 6) are linkage rods 34a and 34b, which although not shown as such, are actually connected to lugs 36a and 36b, respectively, of actuator 16. It should be appreciated that lugs 36a and 36b could be the same as lugs 20a and 20b (FIG. 1). Alternatively, linkage rods 34a and 34b may actually be inserted into actuator 16, as shown in FIGS. 5 and 6, and be driven by some internal pistons (not shown) which operate either cooperatively, or independently, with lugs 36a and 36b.

Flaps 22 are movably disposed downstream of the engine and mounted in close proximity to pivot points 14a and 14b (at hinge fittings 30a and 30b, respectively) where pivoting of the thrust reverser doors occurs. As shown in FIG. 3, each flap 22 has a section which is movably disposed in close proximity to one of the pivot points so that this section substantially fills the corresponding substantially arcuate notch formed when the doors are in their stowed position, to modify the opening of the downstream extension formed by the doors from a non-planar annular opening to a substantially planar annular exit opening.

Further shown in FIG. 3 are safety latch boxes 38a and 38b, which are used to lock doors 6a and 6b, respectively, when the doors are in their stowed position, to ensure that the doors will not be accidentally deployed. A description of how similar latch boxes operate with respect to the doors is given in U.S. Pat. Ser. No. 4,422,605, incorporated herein by reference.

FIGS. 4, 5 and 6 show, in isolation, a flap of the instant invention in both its operative and inoperative positions. In the perspective view of FIG. 4, it can be seen that flap 22 may be extended translationally to either an operative (effective) position in which the flap substantially fills the arcuate notch or an inoperative (ineffective) position to which it is moved to a storage position when the thrust reverser doors are deployed. FIG. 5 shows a cross-sectional view of the flap in its operative position while FIG. 6 shows the flap extended to its inoperative position. As shown in these figures, flap 22 is connected to linking rods 34a and 34b by elongated members 42a and 42b, respectively, which are in turn connected to respective flap position stops 40a and 40b. The respective linkage rods 34a and 34b are connected to the corresponding elongated members 42a and 42b, by means of bolts and spring members 44a and 44b. To allow flap 22 to move in the longitudinal direction with respect to actuator 16, L-shaped pivot members 46a and 46b are provided to pivotally connect both flap 22 and actuator 16.

By either pulling or pushing linkage rods 34a and 34b against members 42a and 42b, respectively, depending on whichever position flap 22 was previously in, flap 22 can be set to a new position. For example, FIG. 5 shows flap 22 in its operative position while FIG. 6 shows flap 22 in its inoperative position. To prevent flap 22 from being maneuvered past the most desirable operative or inoperative position, position stops 40a and 40b are used. As illustrated in FIGS. 5 and 6, position stop 40b has extensions 48a and 48b (actually screws or bolts threaded into the extensions of position stop) to ensure that flap 22 will stop at the desired positions.

FIGS. 7 to 11 show the interaction between the thrust reverser doors and the flaps for effecting a substantially planar annular exit opening.

Figure 7:
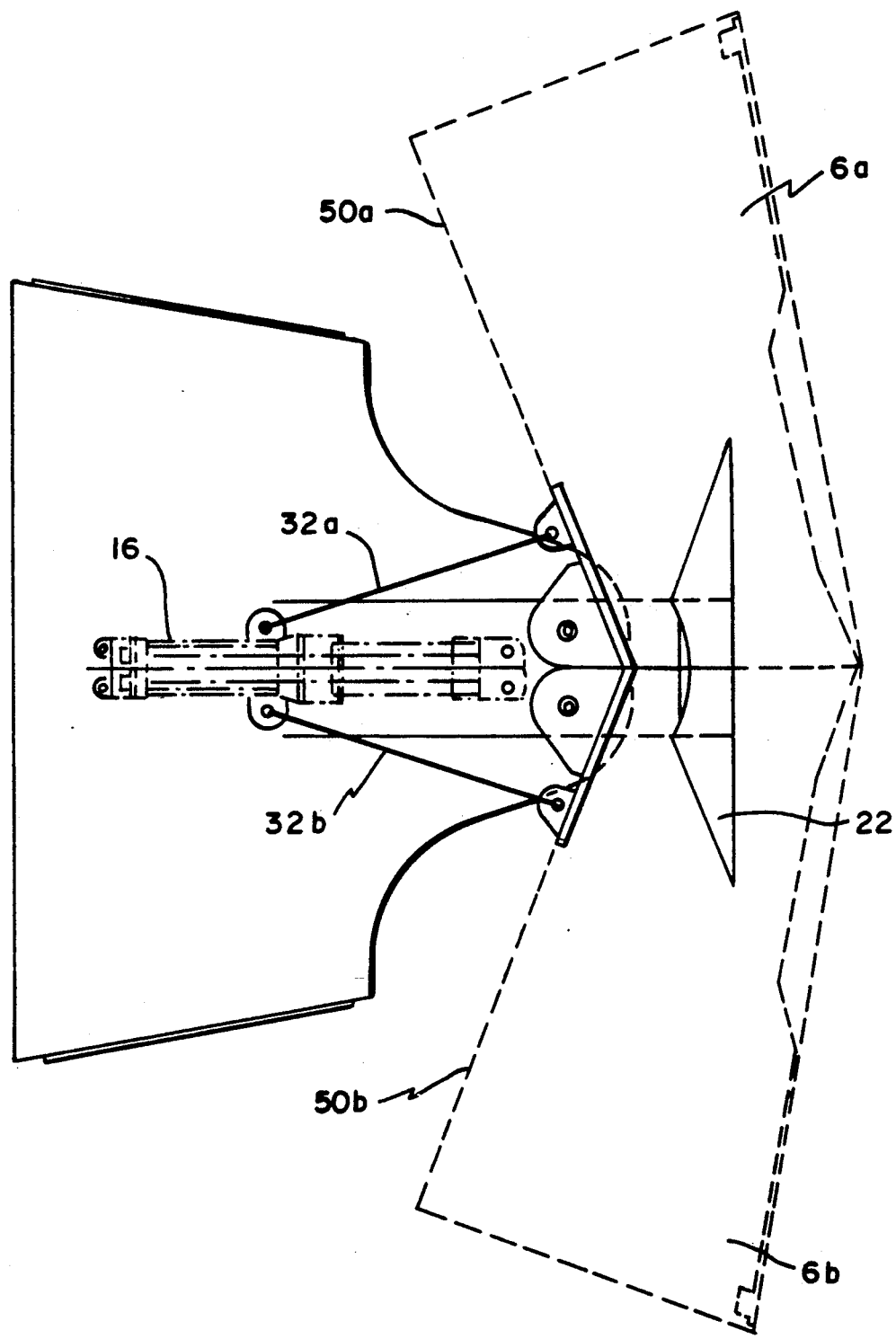
FIG. 7 is a cross-sectional view of only the downstream portion of the present invention jet engine, with deployed thrust reverser doors.
Figure 8:
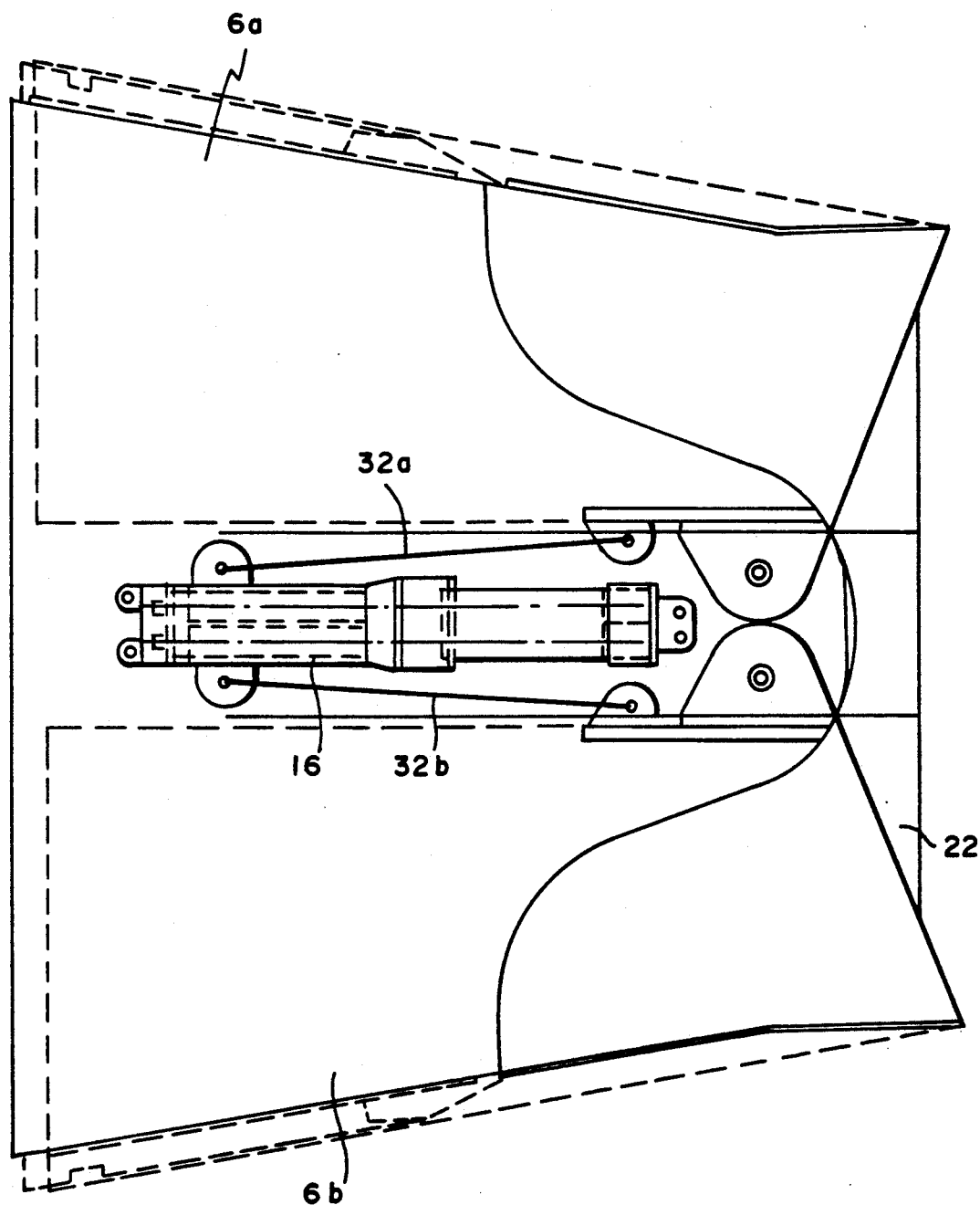
FIG. 8 is a cross-sectional view of only the downstream portion of the present invention jet engine, the stowed thrust reverser doors shown in combination with the FIG. 4 mechanism for illustrating a substantially planar exit opening for the jet engine.

Consider the top views of flap 22 in FIG. 7 where doors 6a and 6b are shown in their deployed position, and in FIG. 8 where doors 6a and 6b are shown in their stowed position. In FIG. 7, it can be seen that actuator 16, by means of linkage rods 32a and 32b, has positioned doors 6a and 6b into their deployed position such that the doors are disposed transversely in the path of the jet output from the engine. Although not clearly shown as such, flap 22, in actuality, is in its inoperative position and is actually located a sufficient distance away from and to the back of the doors such that not only would flap 22 not interfere with, or obstruct, movement of the doors when the same are being pivoted to their deployed position, but it would actually be positioned behind the doors when the same have been deployed, so that it is not exposed to the jet of the engine. This in turn not only greatly reduces the cost for manufacturing flap 22, as a lower grade material may be used since the flap will not be directly exposed to the hot gases of the jet, but also allows a lightweight construction since the flap is never severely loaded.

Figure 10:
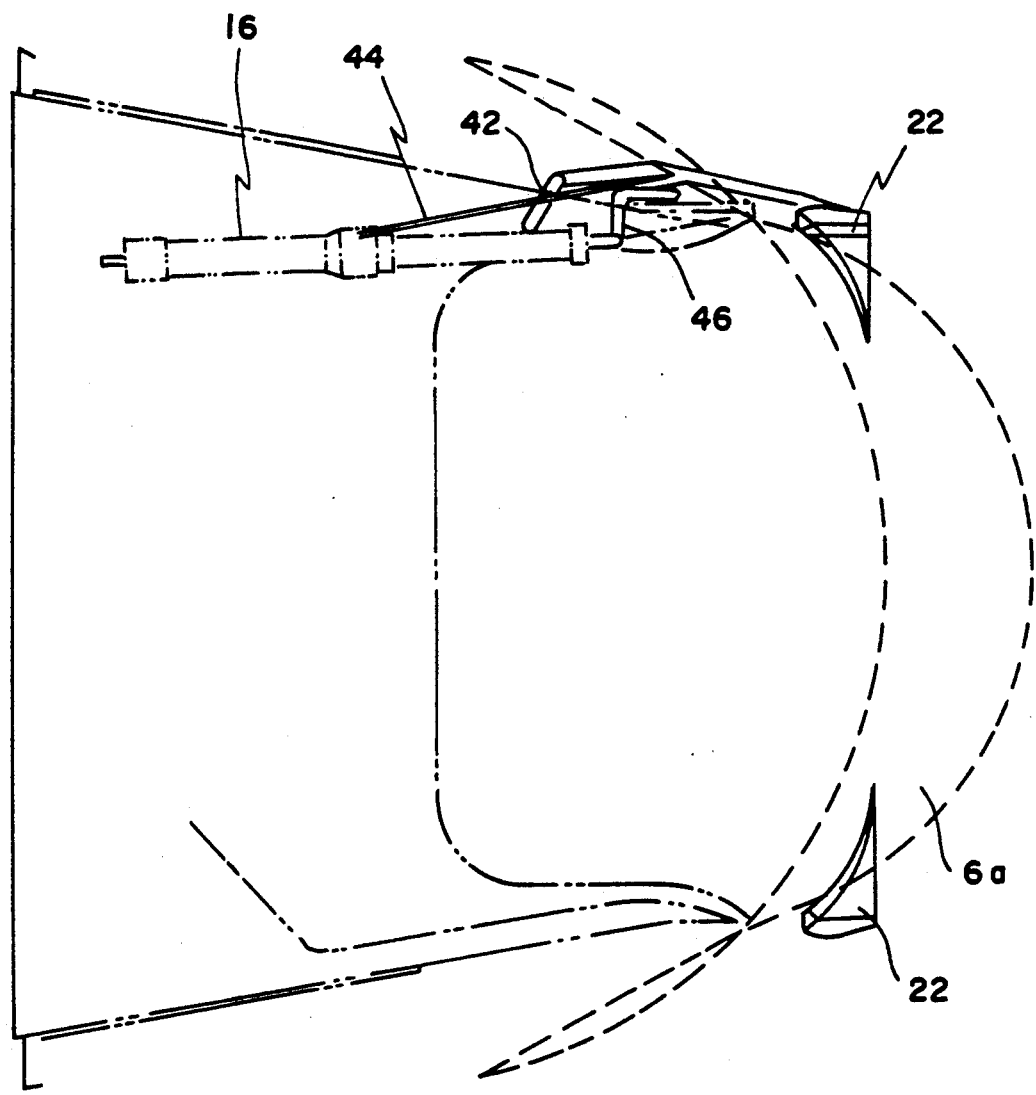
FIG. 10 is a top view of the FIG. 4 mechanism, shown relative to a deployed thrust reverser door.

The positioning of flap 22 relative to doors 6a and 6b when the latter are in their deployed position is better illustrated in FIG. 10, where only one actuator member 16 is shown. There, it can be seen that flaps 22, although appearing to be positioned adjacent to the thrust reverser doors are, in reality, positioned behind the same, when the doors are in their deployed position, as the doors are actually curve-shaped.

In FIG. 8, doors 6a and 6b are shown to be in their stowed position. For the sake of simplicity, linkage rods 34a and 34b connecting flap 22 to actuator 16 are not shown.

Figure 9:
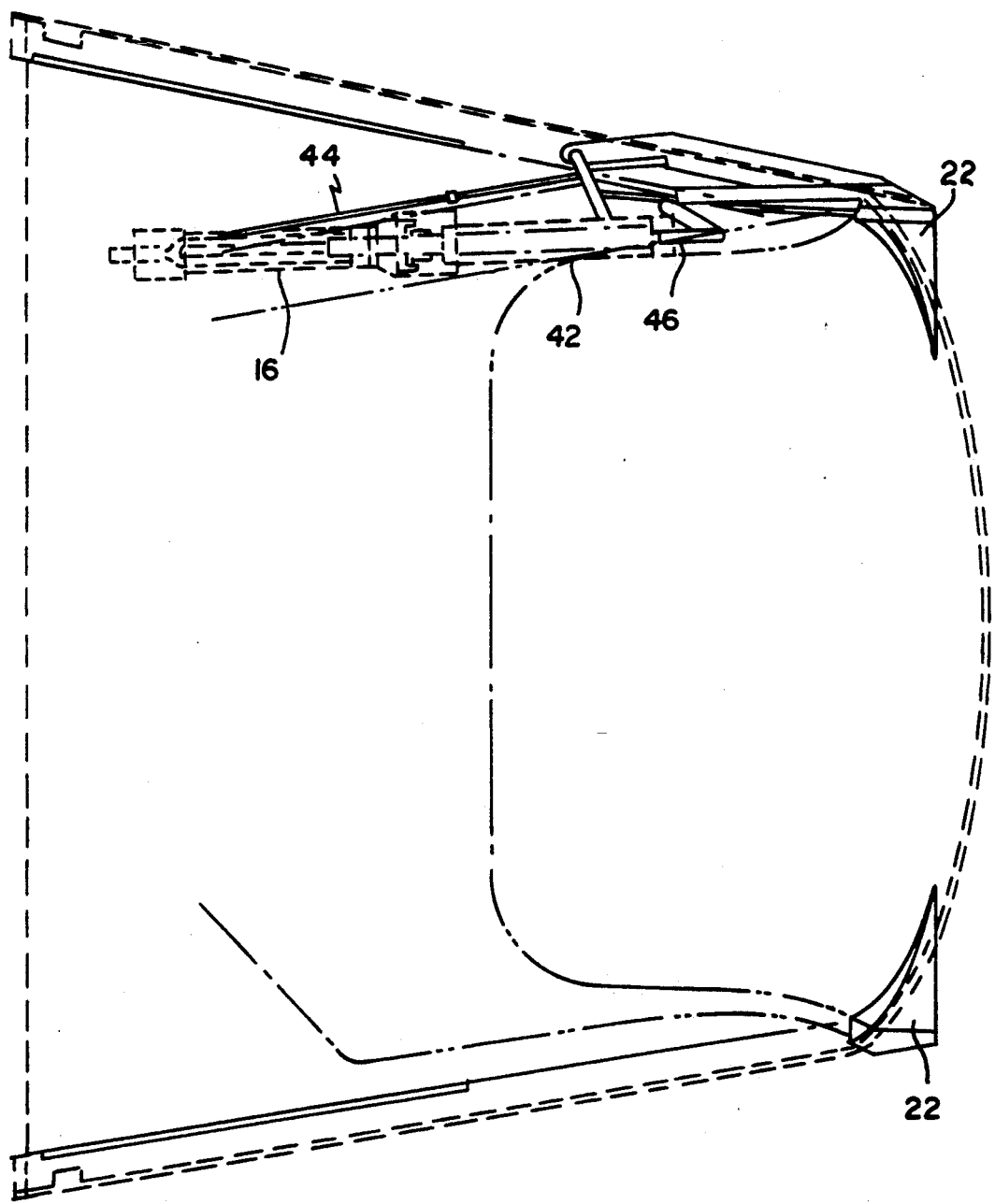
FIG. 9 is a simplified top view of the FIG. 4 mechanism, in relation to thrust reverser doors in their stowed position.

FIG. 9 shows a cross-sectional view of flaps 22 in their operative position which is effective to fill, at least in part, the substantially arcuate notches formed at the downstream ends of the doors when the doors are in their stowed position. As shown, a substantially planar annular exit opening is effected. It must be noted that although the exit opening is not completely planar, from empirical studies and wind tunnel testing it has been found that such substantially planar exit opening gives the substantially same thrust efficiency as if a completely planar exit opening is provided.

For this embodiment, although both the thrust reverser doors and the flaps are shown to be operated by the same actuator, it should be appreciated that different actuators may also be used. For example, actuator 16 may be confined to move just the thrust reverser doors; and additional actuators, similar to actuator 16, may also be used individually to maneuver flaps 22, in response to the positioning of the thrust reverser doors. Thus, instead of moving simultaneously with the thrust reverser doors, flaps 22 may actually be moved (from the inoperative position to the operative position) after the thrust reverser doors have been fully stowed. On the other hand, if flaps 22 were to be moved from the operative position to the inoperative position, in response to the thrust reverser doors being pivoted to their deployed position, with independently operating actuators, flaps 22 may be moved ahead of the thrust reverser doors such that they are moved completely away from the doors and are already in their inoperative storage position before the doors are deployed. Of course, with a single actuator, such as 16, for operating both the thrust reverser doors and the flaps simultaneously, the movement of both the doors and the flaps necessarily has to be coordinated in such a way that no obstruction between the doors and the flaps occurs when they are in motion. Such coordination, by the afore-discussed linking rods 32a, 32b and linkage rods 34a, 34b, is conventional and will not be further discussed.

Moreover, instead of independent hydraulic actuators for maneuvering the flaps, a combination of cams and springs which works in response to the folding and unfolding of the thrust reverser doors may also be used. For example, a combination cam and spring mechanism may be located somewhere on anchor structure 24, to operate with the to-be-joined rearwardmost edges 50a and 50b (shown in FIG. 7) of the thrust reverser doors, for either pulling or pushing flaps 22 into their operative or inoperative position.

Inasmuch as the present invention is subjected to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

What is claimed is:

1. An improved thrust reverser for an aircraft jet engine which reverser is of the kind comprising a plurality of doors pivotally mounted about an axis transverse to the gas jet of the engine and disposed adjacent the downstream end of the engine, each of said doors being pivotable between a stowed position in which said doors are clear of the gas jet to thereby form a downstream extension of the engine through whose opening the gas jet exits the engine, and a deployed position in which said doors are disposed transversely of the path of the jet to effect a reversal of engine thrust, said doors both defining arcuate edges at their rearwardmost ends which edges are so configured that they substantially abut upon deployment of said doors to permit said doors to effect reversal of at least a major portion of the gas jet, whereupon said edges of said doors necessarily define a non-planar exit opening when said doors are stowed, the improvement comprising:

a plurality of flap members supported adjacent the downstream end of the engine exhaust nozzle; and flap operating means for selectively moving said flap members between respective operative and inoperative positions;

said flap members being movable by said flap operating means to an operative position when said thrust reverser doors are stowed to thereby effectively fill, at least in part, substantially arcuate notches formed at the downstream ends of the doors by reason of said arcuate rearwardmost edges of said thrust reverser doors;

said flap members being also movable by said flap operating means to an inoperative position when said thrust reverser doors are deployed to thereby permit the substantially abutting of said arcuate rearwardmost edges of said doors to effect the reversal of engine thrust;

wherein a substantially planar annular exit opening for the engine is provided when said doors are in their stowed position and said members are in the operative position.

2. The thrust reverser according to claim 1, further comprising:

means coupled to said flap operating means and working cooperatively therewith for simultaneously moving said members to the operative position when said doors are being pivoted to their stowed position or are at their stowed position, and moving said members to the inoperative position when said doors are being pivoted to their deployed position or are at their deployed position.

3. The thrust reverser according to claim 1, further comprising:

linkage means coupled to said flap operating means for moving said members to the operative position when said doors are in their stowed position, and moving said members to the inoperative position when said doors are in their deployed position.

4. The thrust reverser according to claim 1, wherein each of said flap members comprise:

a section movably disposed in close proximity to a corresponding one of the points about which said doors pivots, each of the sections covering a corresponding one of said substantially arcuate notches formed when said doors are in their stowed position to modify the opening of the downstream extension from the non-planar annular opening to the substantially planar annular exit opening.

5. The thrust reverser according to claim 1, wherein each of said flap members comprises:

a section movably disposed in close proximity to said doors and movable by linking means for translational movement lengthwise along the longitudinal axis of the engine;

wherein, when said doors are pivoted to their deployed position, said flap is translated a sufficient distance away from said doors such that said doors can be pivoted without being obstructed by said flap, said flap being positioned behind said doors and thus is not exposed to the hot gases of the jet from the engine when said doors are deployed.

6. The thrust reverser according to claim 3, wherein said flap operating means comprises:

at least one linking rod coupled to at least one spring means for moving said members.

7. The thrust reverser according to claim 1, further comprising:

linkage means coupled to said doors for automatically moving said members to the inoperative position when said doors are being pivoted to their deployed position, and moving said members to the operative position when said doors are being pivoted to their stowed position.

8. In an aircraft having a jet engine including a thrust reverser coupled downstream thereto and having at least two symmetrical doors pivotally mounted about an axis transverse to the gas jet of the engine, each of said doors pivotable between a stowed position in which said doors are clear of the gas jet of the engine for forming a downstream extension of the engine through whose opening the gas jet exits from the engine, and a deployed position in which said doors are disposed transversely of the path of the gas jet, said doors both defining arcuate edges at their rearwardmost ends which edges are so configured that they substantially abut upon deployment of said doors to permit said doors to effect reversal of at least a major portion of the gas jet, whereupon said edges of said doors necessarily define a non-coplanar exit opening due to substantially arcuate notches formed at the downstream ends of said doors when said doors are stowed, apparatus for providing a substantially planar annular exit opening for the jet engine, comprising:

at least two flap members movably disposed downstream of the engine and relative to said doors; and means connected to said flap members for maneuvering said members to an operative position effective to fill, at least in part, the substantially arcuate notches formed at the downstream ends of said doors, said flap members being maneuvered to the operative position when said doors are being moved to, or are in their stowed position, to modify the downstream extension of the engine for effecting a substantially planar annular exit opening therefor.

9. Apparatus according to claim 8, wherein said maneuvering means comprises:

at least one linking rod coupled to an actuating means, said actuating means providing translational movement to move the linking rod between the operative position and at least one other position.

10. Apparatus according to claim 9, wherein said actuating means has further coupled thereto respective one ends of at least one pair of rods whose respective other ends are connected to a corresponding one of said doors, said actuating means pivoting said doors and maneuvering said flap members simultaneously.

11. Apparatus according to claim 8, wherein each of said flap members comprises:
   a section movably mounted to the engine in close proximity to a corresponding one of the points where the pivoting of said doors occur;
   wherein, when said flap member is in the operative position, said section effectively fills the corresponding substantially arcuate notch on a side of the downstream extension to modify the exit opening of the downstream extension to the substantially planar annular exit opening.

12. Apparatus according to claim 8, wherein each of said flap members comprises:
   a section movably disposed in close proximity to a corresponding one of the points about which the pivoting of said doors occurs, said flap member movable by said maneuvering means lengthwise along the longitudinal axis of the engine such that, when said doors are pivoted from one of their positions to the other, the movement of said doors are not hindered by said flap member.

13. Apparatus according to claim 8, wherein each of said flap members comprises:
   a section movably disposed in close proximity to a corresponding one of the points about which the pivoting of said doors occurs, said flap member positionable by said maneuvering means behind said doors when said doors are in their deployed position such that said flap member is not exposed to the gas jet of the engine.

14. Apparatus according to claim 8, further comprising:
   actuating means coupled to said doors for pivoting said doors from one of their positions to the other, said actuating means working independently of said maneuvering means.

15. Thrust reverser for a jet engine, in particular one used in an aircraft, of the type incorporating at least two doors each of which is mounted to pivot around an axis which is transverse to the jet engine flow, in such a manner that said doors may be placed either in a stowed position, in which they constitute a portion of the filleting of the engine or the fuselage of the aircraft, or in a deployed position, in which said doors are arranged transversely to the gaseous jet flow, at the trailing edges of said doors, and falling within planes which are inclined and transverse in relation to the longitudinal axis of the engine, mark off laterally, in said stowed position, substantially triangular shaped indentations, and have, within their respective planes, end pieces having a greater thickness than that of their central portion, wherein the thrust reverser incorporates movable flaps having a shape matching at least partially the shapes of said indentations and whose principal outer surface and inner surface provide continuity with the outer surface and the inner surface, respectively, of said doors and end in a trailing edge having a thickness which is smaller than that of said end pieces, and wherein said flaps, when said doors are stowed, adopt an operative position constituting an extension of said doors while substantially sealing off said indentations, and, when the doors are deployed, an outwardly projecting position.

16. Thrust reverser according to claim 15, wherein the trailing edge of each movable flap has a thickness which is approximately equal to that of the central portion at the trailing edge of the doors.

17. Thrust reverser according to claim 15, wherein said movable flaps are connected to rigid arms emanating from the nozzle of said engine using controllable jointing devices.

18. Thrust reverser according to claim 17, wherein said controllable jointing devices are of the mechanical type.

19. Thrust reverser according to claim 15, wherein the lateral sides of said movable flaps, which are designed to come into contact with the end pieces at the trailing edges when the doors are stowed, each has an inclined piece which, in said stowed position, works in conjunction with a corresponding inclined piece mounted on each end piece, and the two inclined pieces of each flap converge substantially in the direction of the longitudinal axis of said engine.

20. Thrust reverser according to claim 19, wherein the inclined pieces of said flaps and said end pieces are sheathed in an anti-friction material, and wherein an airtight joint is mounted between said corresponding inclined pieces.

21. Thrust reverser according to claim 17, wherein said jointing devices of each flap incorporate a jointing pin which is orthogonal to the transverse jointing pins of said doors and is connected to the corresponding rigid arm, and elastic return devices connected by their respective ends to said flap and said arm.

22. Thrust reverser according to claim 17, wherein said jointing devices on each flap incorporate a torsion bar orthogonal to the transverse jointing pins of said doors which is connected to the corresponding rigid arm.

23. Thrust reverser according to claim 17, wherein said jointing devices on each flap comprise a system of connecting rods whose ends are connected to said flap and to said doors, respectively, by means of ball joints.

24. Thrust reverser according to claim 15, wherein said movable flaps are held in their projecting position by a mechanical finger-and-cam system mounted between the hinge fittings of the pins of the doors and said flaps.

* * * * *